3,377,302
SAPONIFIED STARCH ACRYLATE GRAFTS
Lewis A. Gugliemelli, Pekin, and Mary Ollidene Weaver and Charles R. Russell, Peoria, Ill., assignors to the United States of America as represented by the Secretary of Agriculture
No Drawing. Filed Jan. 18, 1966, Ser. No. 521,441
3 Claims. (Cl. 260—17.4)

A nonexclusive, irrevocable royalty-free license in the invention herein described, throughout the world for all purposes of the United States Government, with the power to grant sublicenses for such purposes, is hereby granted to the Government of the United States of America.

This invention relates to the saponified derivatives of acrylate or methylacrylate grafted starches, dilute aqueous solutions or dispersions of which saponified and thereby solubilized starch graft copolymers we have found to exhibit astonishingly high viscosities coupled with very high resistance to the ordinarily irreversible loss of viscosity on exposure either to heat or to high rates of shear, thereby providing a new class of thickening agents having utility as drilling mud additives, hydraulic fluids, and flocculating agents.

Staley's British Patent No. 869,501 discloses the completely water insoluble methylacrylate starch grafts that we employ as starting materials. However, the said British patent does not suggest or teach any utility whatever for these nondispersible starch graft polymers that are also insoluble in organic solvents, nor does it suggest any chemical modifications thereof. While it might be reasonable to predict that saponification of these prior art grafted starch copolymers would improve their dispersability or solubility in water and thus provide dilute aqueous dispersions or solutions whose viscosities at the 1 percent level would resemble the 20-3000 cps. values of such well known polysaccharide thickeners as hydroxyethyl celluose, CMC, sodium alginate, or of natural gums such as guar, karaya, and locust bean, it was most surprising to find that aqueous dispersions containing 0.76% to 1.0% of our saponified starch methylacrylate graft copolymers containing from 1 to 2 parts by weight of chemically bonded polymethylacrylate per part by weight of starch exhibit viscosities of from 11,000 to 37,500 cps., especially in view of the fact that corresponding aqueous dispersions containing identically proportioned mixtures of unreacted starch per se and the saponified polymethylacrylate had viscosities of only about 1000–1400 cps., and also in further view of the well known fact that branched polymers, e.g., amylopectin, exhibit much lower viscosities than linear polymers, e.g., amylose having a corresponding molecular weight.

A general object of our invention is the chemical modification of starch that has been grafted with about 1 to 2 weight equivalents of a polymerizable unsaturated ester monomer such as methylacrylate to thereby provide water dispersible saponified starch graft copolymer derivatives whose aqueous dispersions exhibit not only phenomenally high viscosities but also freedom from retrogradation and resistant to heat-induced permanent loss of voscosity.

A more specific object is the saponification of polymethylacrylate-grafted starches to provide thickening agents that should improve the industrial utilization of surplus starch.

A further object is the inexpensive preparation of polymethylacrylate starch grafts in which the hydrophobic ester function present in the original grafted ester side chains is converted by the saponification to either the hydrophilic carboxylic acid salt or to the free acid form that confers both dispersibility and extensive solvation, whereby viscosities greatly exceeding those given by similarly dilute dispersions of sodium alginate or carboxymethylcellulose are obtained. The saponified polymethylacrylate grafts in the starting materials have weight-average molecular weight (determined by light scattering techniques) of 3,000,000 to 3,500,000 which correspond to approximately 1 highly polymerized PMA side chain for every 11,000 to 18,000 starch AGU's, i.e., a D.S. range from 0.000091 to 0.000056.

Still another object is the uncomplicated and residue-free conversion of the extremely hydrophobic and apparently useless prior art starch methylacrylate ester grafts into highly dispersible starch grafts containing carboxylated functional groups.

In accordance with the above objects we have now discovered that the nondispersible very lowly substituted starch copolymers formed by the ceric ammonium nitrate-initiated reaction of either granular or gelatinized starch with from about 1 to 2 proportions by weight of methylacrylate are readily saponified with a theoretical amount of base in a minimum amount of water to provide carboxyl-containing starch graft copolymers that are water dispersible and that optionally can be precipitated from the reaction solution with alcohol for packaging or can be diluted without isolation to directly provide low cost industrial thickeners.

Example 1

100 g. of granular starch containing ca. 11.5% moisture were pretreated by heating in 1000 ml. of water at 50° C. for 1 hour under nitrogen. The resulting slurry was then cooled to 25° C., and 30 ml. of a .1 N solution of ceric ammonium nitrate in 1 N nitric acid was added. Stirring was continued under nitrogen for 10 minutes. Then 200 ml. of freshly distilled methylacrylate was added. After reaction at 25° C. for 15 to 20 minutes, the exothermic polymerization reaction required external cooling to hold the reaction at 30° C. The reaction was stopped 3 hours after the addition of methylacrylate, and filtration gave 215 g. of crude starch polymethylacrylate graft copolymer containing a minor amount of polymethylacrylate. After washing with water to remove unreacted methylacrylate monomer and extracting with hot benzene to remove the byproduct free polymethylacrylate, there was obtained 207 g. of starch-methylacrylate graft copolymer consisting of approximately 1 part by weight of starch and 1 part by weight of the chemically bonded polymethylacrylate. On analysis, this prior art starting material was found to contain 50.46% carbon and 6.61% hydrogen. The weight average molecular weight of the grafted side chains was found to be 3,600,000 corresponding to ca. 1 grafted side chain for every 18,000 AGU's. For analysis the grafted product was first saponified and the starch portion of the copolymer then hydrolyzed with 2 N HCl. Light scattering molecular weight determinations of the liberated side chains were made in 0.2 N HCl to 1 g. portions of intact starch graft copolymer in respective Erlenmeyer flasks were added respectively 5 ml., 10 ml., and 15 ml. of 10% KOH solution. The flasks were stoppered and heated at 80° C. for 2 hours. The saponified starch graft copolymer products were cooled to room temperature, and respective amounts of water, i.e., 95 ml., 90 ml., and 85 ml., were gradually added with vigorous stirring to provide a 1% dispersion in each flask. Brookfield viscosities of the respectively saponified 1% solutions were 6500 cps., 500 cps., and 250 cps. The diminished viscosity values of the dispersions treated with the larger amount of alkali, i.e., an excess over that required for saponification per se, is due to the depressive action of excess base. The viscosities are inversely related to rates of shear as shown in Table 1 for the sample saponified with 5 ml. of 10% KOH.

TABLE 1

| Rate of shear (r.p.m.): | Viscosity, 25° C., No. 4 spindle (cps.) |
|---|---|
| 60 | 4,000 |
| 30 | 6,500 |
| 12 | 12,500 |
| 6 | 15,000 |

Example 2

This example illustrates that greater viscosities of 1% dispersions of our saponified starch-methylacrylate grafts obtained when the saponification is applied to a graft copolymer in which the present weight add-on of polymethylacrylate to starch is increased from approximately 1:1 to approximately 2:1. The same preparative procedure described in Example 1 was employed except for the use of 240 ml. of methylacrylate and 40 ml. of ceric ammonium nitrate reagent. A yield of 320 g. of crude product containing 10 g. of polymethylacrylate was obtained. After removal of the polymethylacrylate with hot benzene, 310 g. of purified graft copolymer was obtained which was found to analyze 52.3% carbon and 6.9% hydrogen. A weight-average molecular weight of the free acid form of the grafted side chains was found to be 3,500,000, corresponding to approximately 1 grafted side chain per 11,000 starch AGU's. Saponification of 1 g. of the purified starch graft copolymer with 5 ml. of 10% KOH at 80° C. for 2 hours gave a product whose 1% dispersion in water had a Brookfield viscosity (spindle No. 4, 30 r.p.m.) of 10,000 cps., while saponification of 1 g. with twice as much under the same conditions gave a product whose 1% dispersion had a viscosity of 1800 cps.

Example 3

For many industrial applications involving thickeners in aqueous systems, it may be advantageous to have high viscosity dispersions containing a minimum amount of metallic ions at a desired pH. This example describes the procedure for the preparation of the free acid form of a saponified starch graft copolymer containing approximately equal parts by weight of starch and polymethylacrylate: 5 g. of the graft copolymer of Example 1 was heated at 80° C. in 25 ml. of 10% KOH without stirring for 2 hours in a stoppered Erlenmeyer flask. The cooled saponified mixture was treated with 35 ml. of 1 N HCl with stirring to convert the potassium salt of the carboxyl group to the free acid form. Then 60 ml. of 90% ethanol was added to precipitate the free-acid form of saponified graft copolymer. The product was recovered by centrifugation, slurried twice in fresh 50% ethanol, and finally dried over absolute ethanol. The viscosity of dispersions of the free-acid graft copolymer is dependent upon pH, which can be regulated by the addition of varying amounts of base, as shown in Table 2.

TABLE 2

| pH: | 1% Dispersions Viscosity [1] (cps.) |
|---|---|
| 3.8 | (free acid) 250 |
| 4.9 | 5,000 |
| 6.2 | 10,000 |
| 8.2 | 11,000 |
| 9.0 | 10,900 |
| 12.2 | 1,200 |

[1] Brookfield viscosity, No. 4 spindle, 30 r.p.m., 25° C.

Free acid graft copolymers made from copolymers consisting of 1 part by weight of starch and 1 part by weight of polymethylacrylate were found to have excellent ability to resist degradation at higher temperatures. A 1% dispersion adjusted to pH 7.5 had a viscosity of 10,000 cps. After heating the dispersion first at 60° C. for 7 hours and then at 80° C. for an additional 7 hours it was found to still have a viscosity of 10,000 cps. at 25° C. Dispersions of our saponified graft copolymers resist degradation at 90° C., and they also exhibit resistance to high shear rates, i.e., a 1% dispersion of the free acid graft copolymer, pH 7.5, which dispersion had a viscosity of 10,000 cps. was placed in a Brabender amylograph-viscometer equipped with a No. 700 cartridge and a 100 g. weight and subjected at 90° C. to shear stress at the rate of 75 r.p.m. Under these conditions the dispersion had a viscosity of 1800 cps.; however, upon cooling to 25° C. the dispersion was found to still have a Brookfield viscosity of 10,000 cps. (spindle No. 4; 30 r.p.m.).

Example 4

This example shows that unusually high viscosities are provided by a 1% dispersion of free acid form of saponified starch-polymethylacrylate graft copolymers made from copolymers consisting of approximately 2 parts by weight of polymethylacrylate and 1 part by weight of starch (Example 2) and that useful viscosities can still be obtained at the 0.06 dispersion level. The steps for preparing the free-acid form of saponified graft copolymer are the same as described in Example 3. Table 3 shows the viscosities of sequentially diluted concentrations of the free-acid saponified graft copolymer in which the pH was adjusted to 6.5.

TABLE 3

| Dispersion, Percent | Spindle No. | Shear Rate (r.p.m.) | Viscosity (cps.) |
|---|---|---|---|
| 1.0 | 4 | 12 | 37,500 |
| 0.5 | 4 | 30 | 8,500 |
| 0.25 | 4 | 30 | 1,200 |
| 0.12 | 4 | 30 | 200 |
| 0.06 | 3 | 30 | 40 |

The production of equivalent material by direct grafting of acrylic acid to starch is not possible because the viscosity of the reaction mixture becomes so high as to prevent a significant degree of grafting to be achieved unless impractical dilute reaction mixtures are used.

We claim:

1. Water dispersible thickening agents prepared by reacting an aqueous dispersion of a ceric-induced graft copolymer consisting of starch and from 1 to 2 parts based on the weight of the starch of chemically bonded polymethylacrylate side chains having an average D.S. per starch AGU of 0.000056–0.000091 for about 2 hours at about 80° C. with an aqueous solution containing 0.5–1.5 parts by weight of KOH based on the weight of graft copolymer whereby to convert the ester function of the polymethylacrylate side chains to the carboxylic acid alkali metal salt.

2. Thickening agents according to claim 1 and wherein the amount of KOH is 0.5 part by weight of copolymer and wherein the resulting carboxylic acid salt function of the polymethylacrylate side chains is further converted to free carboxylic acid radicals by the addition of dilute HCl.

3. As a novel thickening agent composition, an aqueous solution having dispersed therein 0.5 percent by weight of the thickening agent as defined in claim 2, said composition being further characterized by a viscosity of about 8500 cps. when subjected to a shear rate of 30 r.p.m.

References Cited

UNITED STATES PATENTS 3,061,471 10/1962 Brockway et al. ____ 117—139.5
3,061,472 10/1962 Brockway et al. ____ 117—139.5

DONALD E. CZAJA, *Primary Examiner.*

R. W. MULCAHY, *Assistant Examiner.*